Apr. 3, 1923.
J. E. SHEUMAN
1,450,822
FLOATING REAMER HOLDER
Filed July 6, 1921
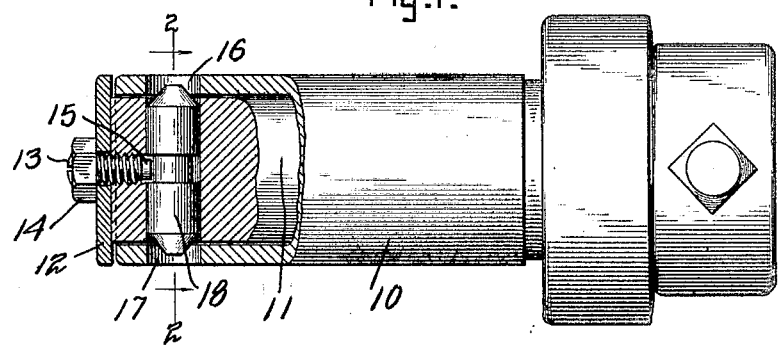
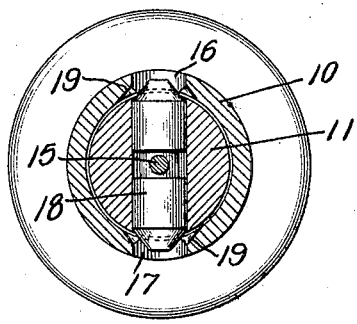
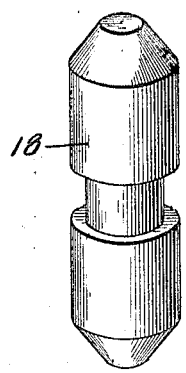
Inventor
James E. Sheuman Patented Apr. 3, 1923.

1,450,822

UNITED STATES PATENT OFFICE.

JAMES E. SHEUMAN, OF WAYNESBORO, PENNSYLVANIA.

FLOATING REAMER HOLDER.

Application filed July 6, 1921. Serial No. 482,767.

*To all whom it may concern:*

Be it known that I, JAMES E. SHEUMAN, a citizen of the United States, residing at Waynesboro, in the county of Franklin and State of Pennsylvania, have invented certain new and useful Improvements in Floating Reamer Holders, of which the following is a specification.

My said invention comprises improvements over the construction shown in my prior Patent No. 1,244,648, granted October 30, 1917, and it is an object of the invention to provide a pin which shall contact with the driving member at both sides of the driven member. In the prior construction it is found that the pin 11 of the patent ordinarily contacts at one side only of the bushing with the wall of an opening 13. This is due to the movement of the shank to a position eccentric or non-coaxial with the bushing, or it may arise from slight differences in diameter or location of openings 13, or from unequal wear on the walls of the opening.

Referring to the accompanying drawings which are made a part hereof and on which similar reference characters indicate similar parts, Figure 1 is a side view of my improved holder for reamers and taps, parts being broken away to show the construction.

Figure 2 is a section on line 2—2 of Figure 1, and

Figure 3 is a detail of the transvers holding pin.

In the drawings, reference character 10 indicates generally the outer bushing or driving member of the tool holder and 11 the shank or driven member which is adapted to float relative to member 10 in the manner described in my prior patent. A head 12 here shown as disk-shaped is attached to the shank 11 by a screw 13 having a threaded portion engaging a hole in the shank, the head extending over the adjacent part of the bushing. A locknut 14 is threaded on the screw 13 to prevent loosening thereof, and the screw has an unthreaded end portion 15 extending into a cylindrical, transverse opening in the shank. This opening may register with corresponding openings 16 and 17 in the walls of the bushing.

A pin 18 rests loosely in the cylindrical opening of shank 11. This pin has a central annular groove and is tapered at both ends. The central annular recess is loosely engaged by the end 15 of screw 14 so as to permit longitudinal play of the pin. If desired, the openings 16 and 17 may be beveled, as at 19, at the sides where they engage the beveled edge of the pin.

It will be seen in operation that when the bushing 10 is driven in either direction, the appropriate beveled portions 19 of the openings 16 and 17 will engage the tapered end portions of pin 18. If the pin is exactly centered and the shank is centered in the bushing, the beveled portions will engage equally and simultaneously with the tapered ends of the pin and there will be no endwise movement of the pin. Should, however, the engagement be unequal for any reason or should only one beveled surface engage its adjoining tapered surface, the pin will move transversely of the shank until the engagement is equal at both ends. This gives equal wear and uniform drive between the bushing and the shank.

It will be obvious that some modifications of the device as shown and described may be made within the scope of my invention and therefore I do not limit myself to the exact devices shown and described but only as indicated in the appended claims. For example, the device is adapted not only to act as a floating holder for driving a tool, but equally well as a holder for work to be rotated or for a stationary tool or stationary work, and the terms of the claims should be construed accordingly.

Having thus fully described my said invention, what I claim as new and desire to secure by Letters Patent, is:

1. A tool holder comprising a shank, a bushing, registering transverse apertures therein, a pin having a cylindrical portion in the aperture of the shank and having oppositely tapered ends adapted to engage the apertures in the bushing, and means to hold the pin against withdrawal, said means permitting limited longitudinal movement thereof.

2. In a tool holder, a shank, a bushing surrounding the same, a driving pin passing through the shank and into apertures in the bushing, the ends of the pin being oppositely tapered and the driving edges of the apertures being beveled to correspond with the tapered portions of the pins.

3. In combination, a tool holding shank, a bushing thereabout, a pin mounted in the shank and capable of longitudinal movement in either direction, means to limit the longitudinal movement, said bushing having oppositely-located apertures, and said pin having oppositely tapered ends engaging said apertures, substantially as set forth.

4. A tool holder comprising a shank, an external bushing therefor, registering transverse apertures in the shank and bushing, and a pin located entirely within the shank and bushing for driving one from the other said pin floating relatively to said shank and bushing, and means to limit the movement of the pin, substantially as set forth.

5. A floating holder for rotary tools comprising an inner member, an outer member, connecting means between them at a plurality of points, and means within the outer member for automatically shifting said connecting means to equalize the rotational strain at the various points, substantially as set forth.

6. A tool holder comprising a shank, an external bushing therefor, registering transverse apertures in the shank and bushing, and a pin contained entirely within the shank and bushing for driving one member from the other said pin being tapered at its ends and having a limited longitudinal movement relatively to the shank and the bushing, substantially as set forth.

7. A tool holder comprising a shank, an external bushing therefor, registering transverse apertures in the shank and bushing, and a pin in said apertures for driving one member from the other, said pin being positioned entirely within the bushing and having floating movement relatively to the shank and bushing and means to limit the movement of the pin, substantially as set forth.

8. In a tool holder, a shank, a bushing surrounding the shank, a floating pin passing thru the shank, tapered ends on the pin engaging relatively large apertures in the bushing, a removable head on the shank abutting against the end of the bushing to hold the parts in place, a screw extending thru the head and a cylindrical end portion on the screw engaging a circumferential groove in the pin, substantially as set forth.

9. In a tool holder, a shank, a bushing surrounding the shank, a floating pin passing through the shank tapered ends on the pin engaging beveled apertures in the bushing said tapered ends engaging equally and simultaneously with the beveled apertures in the bushing to prevent any endwise movement of the pin, a removable head on the shank abutting against the end of the bushing to hold the shank in place, a screw passing through the head and into the shank, a cylindrical end portion on the screw engaging a circumferential groove in the pin, and a lock-nut on the screw, substantially as set forth.

In witness whereof, I have hereunto set my hand and seal at Waynesboro, Pennsylvania this 28th day of June, A. D. nineteen hundred and twenty-one.

JAMES E. SHEUMAN. [L. S.]

Witnesses:
A. STEWART ETTES,
W. H. AUBREY.